(12) United States Patent
Wu et al.

(10) Patent No.: US 12,007,496 B2
(45) Date of Patent: Jun. 11, 2024

(54) METHOD, APPARATUS AND COMPUTER READABLE STORAGE MEDIUM FOR ESTABLISHING PRECISE LOCATION OF A TERMINAL IN WIRELESS COMMUNICATION WITH BASE STATIONS

(71) Applicant: HON LIN TECHNOLOGY CO., LTD., Taipei (TW)

(72) Inventors: Hsuan-Yi Wu, New Taipei (TW); Wen-Rong Wu, Hsinchu (TW); Wei-Han Hsiao, Hsinchu (TW); Mykola Servetnyk, Hsinchu (TW)

(73) Assignee: HON LIN TECHNOLOGY CO., LTD., Taipei (TW)

( * ) Notice: Subject to any disclaimer, the term of this patent is extended or adjusted under 35 U.S.C. 154(b) by 332 days.

(21) Appl. No.: 17/568,838

(22) Filed: Jan. 5, 2022

(65) Prior Publication Data

US 2023/0204709 A1    Jun. 29, 2023

(30) Foreign Application Priority Data

Dec. 27, 2021  (TW) ................... 110148984

(51) Int. Cl.
*G01S 5/02* (2010.01)
*G01S 5/10* (2006.01)
*H04W 4/02* (2018.01)
*H04W 4/021* (2018.01)

(52) U.S. Cl.
CPC .............. *G01S 5/0268* (2013.01); *G01S 5/10* (2013.01); *H04W 4/021* (2013.01); *H04W 4/023* (2013.01)

(58) Field of Classification Search
CPC ... H04W 64/00; H04W 24/10; H04W 64/003; H04W 4/02; H04W 4/025; H04W 88/02; H04W 72/04; H04W 56/0095; H04W 56/004; H04W 56/0075
See application file for complete search history.

(56) References Cited

U.S. PATENT DOCUMENTS

| | | | |
|---|---|---|---|
| 2019/0223140 A1* | 7/2019 | Grossmann | G01S 5/02585 |
| 2020/0267681 A1* | 8/2020 | Ferrari | H04B 7/02 |
| 2020/0393532 A1* | 12/2020 | Chae | G01S 5/0273 |
| 2021/0368338 A1* | 11/2021 | Lord | H04W 64/00 |

OTHER PUBLICATIONS

Behailu Yohannes Shikur, Tobias Weber, TDOA/AOD/AOA localization in NLOS environments, DOI:10.1109/ICASSP.2014. 6854860, May 2014, Conference: ICASSP 2014—2014 IEEE International Conference on Acoustics, Speech and Signal Processing (ICASSP).

* cited by examiner

*Primary Examiner* — Kwasi Karikari
(74) *Attorney, Agent, or Firm* — ScienBiziP, P.C.

(57) ABSTRACT

A method, applied in an apparatus and computer readable storage medium, for establishing location of a target terminal in an obstructed environment comprises determining, based on indoor environmental information and data observed by a plurality of base stations in communication with the terminal, establishes lines of signals from the terminal scattered by local obstructions, and based on positional information as to the obstructions which cause the scattering, estimating a more precise positional information of the terminal.

11 Claims, 3 Drawing Sheets

METHOD, APPARATUS AND COMPUTER READABLE STORAGE MEDIUM FOR ESTABLISHING PRECISE LOCATION OF A TERMINAL IN WIRELESS COMMUNICATION WITH BASE STATIONS

FIELD

The subject matter herein generally relates to wireless communications, and more particularly, to a method, apparatus, and computer readable storage medium for indoor locating.

BACKGROUND

Indoor locating is used in wireless communication systems for a variety of applications. The common method is to locate the target mobile terminal by analyzing data of a plurality of base stations in respect of signals emitted by the target terminal. The data comprises: arrival time, arrival angle, arrival time difference, and received signal strength.

However, although establishing location based on the data observed has good performance, the estimated location of the target mobile terminal has some errors with the actual location because the overall layout of the indoor environment of the target terminal is not considered. Providing users with an accurate, real-time, and robust location estimation is problematic.

BRIEF DESCRIPTION OF THE DRAWINGS

Implementations of the present technology will now be described, by way of embodiment, with reference to the attached figures, wherein.

DETAILED DESCRIPTION

Figure 1:
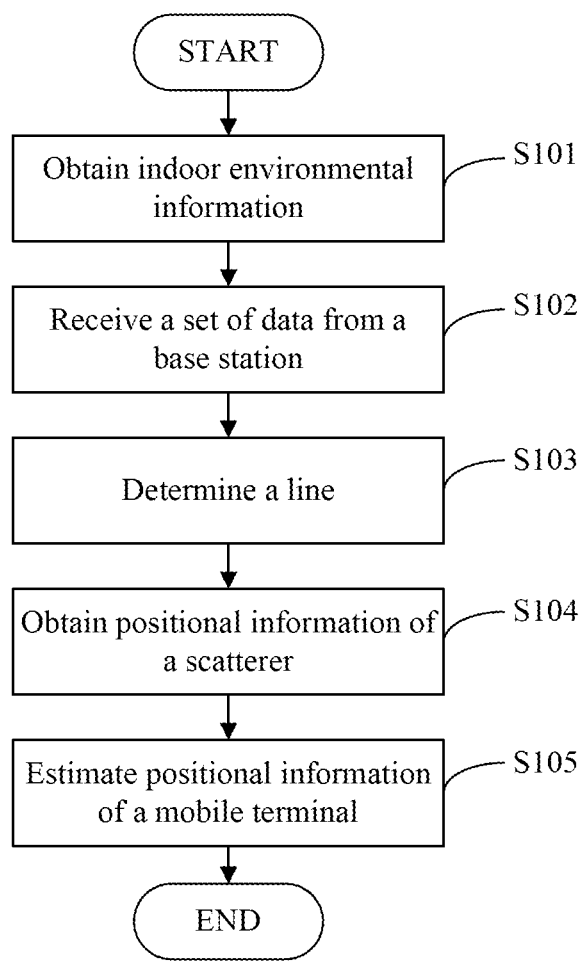
FIG. 1 is a flow chart of one embodiment of a method for establishing an indoor location.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 is a flow chart of a method for establishing an indoor location, the method comprising the following main steps:

At step S101, obtaining indoor environmental information. In one embodiment, the indoor environmental information can be created in advance. In one embodiment, the indoor environmental information comprises positional information of a plurality of base stations and a distribution of scatterers, the plurality of scatterers comprising walls, furniture, and metal devices, etc.

At step S102, receiving a set of data from a base station of the plurality of base stations for a mobile terminal to be positioned. The data set comprises Time Difference of Arrival (TDOA), Angle of Arrival (AOA), and Angle of Departure (AOD).

During indoor transmission of wireless signals, reflections occur due to the presence of scatterers. If multiple reflections from many different scatterers occur during transmission, the signal strength is severely degraded. Therefore, multiple reflections of signals should be ignored and only single reflections need to be considered, i.e., the signals which are only reflected once after emission from the transmitter to the receiver. In following examples, the symbols with subscripts $s_c$ represent symbols used in a single reflection in a non-line-of-sight indoor environment.

At step S103, determining a line, based on the indoor environmental information and the set of observation data, that pass through a scatterer corresponding to the base station, a two-dimensional (2D) planar projection point of the base station, and a 2D planar projection point of the mobile terminal.

Figure 2:
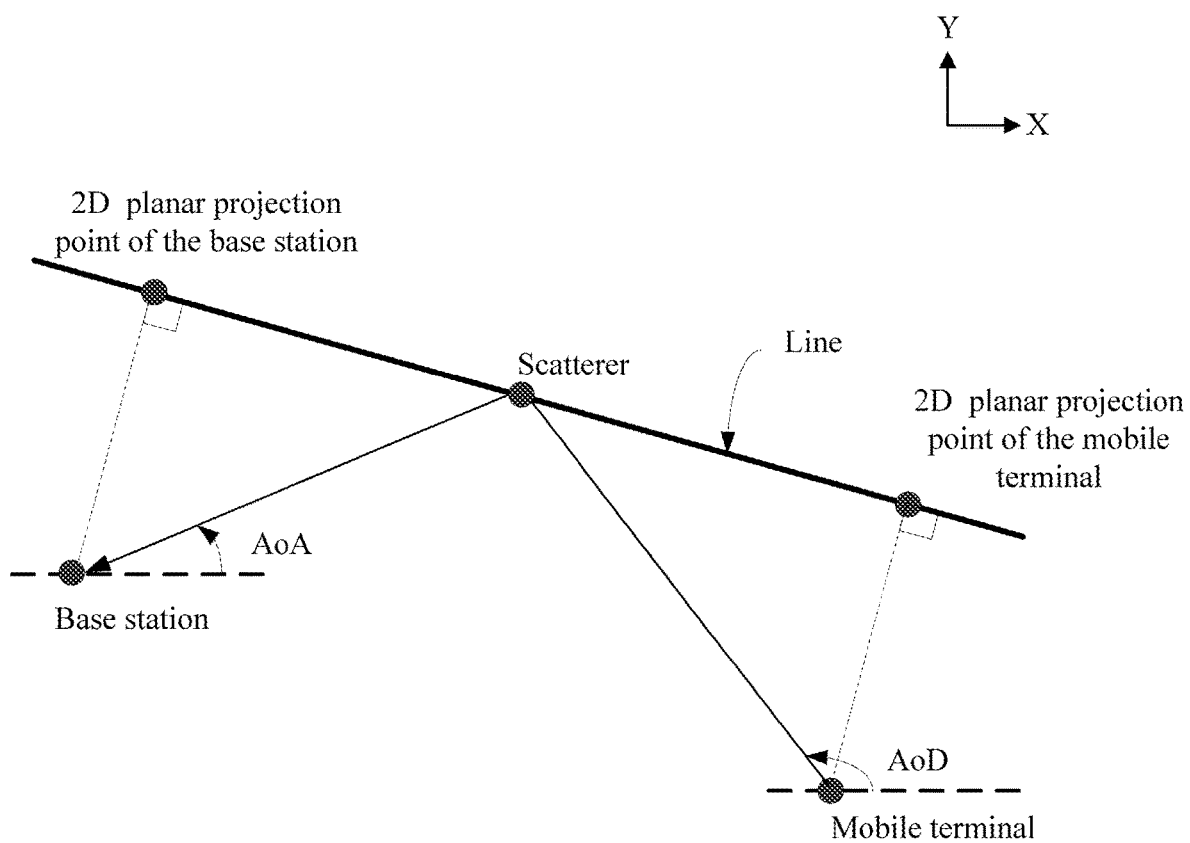
FIG. 2 is a schematic diagram of one embodiment of a line in a two-dimensional plane in the method of FIG. 1.

Referring to FIG. 2, a schematic diagram of the line in a 2D plane is shown, where the scatterer corresponding to the base station is located on the line.

At step S104, obtaining positional information of the scatterer with a constraint that the scatterer must be located on the line.

Specifically, the positional information of the k-th base station $BS_k$ is denoted as $x_{B,k}=[x_{B,k},y_{B,k}]^T$, the positional information of the mobile terminal is denoted as $x_M=[x_M,y_M]^T$, and the line is denoted as an equation of $a_{s_k}x+b_{s_k}y+c_{s_k}=0$. The coordinates of the 2D planar projection point of the base station are denoted as $x_{SB,k}(x_{B,k})=[x_{SB,k},y_{SB,k}]^T$ and the coordinates of the 2D planar projection point of the mobile terminal are denoted as $x_{SM,k}(x_M)=[x_{SM,k},y_{SM,k}]^T$, and the following expressions obtained:

$$x_{SB,k}(x_{B,k}) = \left[\frac{b_{s_k}^2 x_{B,k} - a_{s_k} b_{s_k} y_{B,k} - a_{s_k} c_{s_k}}{a_{s_k}^2 + b_{s_k}^2},\right.$$

$$\left.\frac{b_{s_k}^2 y_{B,k} - a_{s_k} b_{s_k} x_{B,k} - a_{s_k} c_{s_k}}{a_{s_k}^2 + b_{s_k}^2}\right]^T, \text{ and}$$

-continued $$x_{SB,k}(x_{B,k}) = \left[\frac{b_{s_k}^2 x_{B,k} - a_{s_k} b_{s_k} y_{B,k} - a_{s_k} c_{s_k}}{a_{s_k}^2 + b_{s_k}^2}, \frac{b_{s_k}^2 y_{B,k} - a_{s_k} b_{s_k} x_{B,k} - a_{s_k} c_{s_k}}{a_{s_k}^2 + b_{s_k}^2}\right]^T.$$

According to FIG. 2, the projection distance between the k-th scatterer (the scatterer corresponding to the base station) and the $BS_k$ is denoted as $d_{SB,k}$, and the projection distance between the k-th scatterer and the mobile terminal is denoted as $d_{SM,k}$, then $$d_{SB,k} = \frac{\xi_{SB,k}}{\sqrt{a_{s_k}^2 + b_{s_k}^2}}, \text{ and } d_{SM,k} = \frac{\xi_{SM,k}}{\sqrt{a_{s_k}^2 + b_{s_k}^2}},$$

where $\xi_{SB,k} = |a_{s_k} x_{B,k} + b_{s_k} y_{B,k} + c_{s_k}|$ and $\xi_{SM,k} = |a_{s_k} x_M + b_{s_k} y_M + c_{s_k}|$.

By the interpolation on $x_{B,k}$ and $x_M$ using $d_{SB,k}$ and $d_{SM,k}$, the position of the k-th scatterer can be obtained by:

$$x_{S,k}(x_{B,k}, x_M) = \frac{\xi_{SM,k}(b_{s_k}^2 x_{B,k} - a_{s_k} b_{s_k} y_{B,k}) + \xi_{SB,k}(b_{s_k}^2 x_M - a_{s_k} b_{s_k} y_B)}{(a_{s_k}^2 + b_{s_k}^2)(\xi_{SM,k} + \xi_{SB,k})} - \frac{a_{s_k} c_{s_k}}{a_{s_k}^2 + b_{s_k}^2}, \text{ and}$$

$$y_{S,k}(x_{B,k}, x_M) = \frac{\xi_{SM,k}(a_{s_k}^2 y_{B,k} - a_{s_k} b_{s_k} x_{B,k}) + \xi_{SB,k}(b_{s_k}^2 y_M - a_{s_k} b_{s_k} x_M)}{(a_{s_k}^2 + b_{s_k}^2)(\xi_{SM,k} + \xi_{SB,k})} - \frac{b_{s_k} c_{s_k}}{a_{s_k}^2 + b_{s_k}^2}.$$

At step S105, estimating positional information of the mobile terminal based on the positional information of the base station, the data set, and the positional information of the scatterer corresponding to the base station.

In one embodiment, the positional information of the mobile terminal is estimated using a constrained Iterative Weighted Least-squares (CIWL) method.

The positional information of the scatterer corresponding to the base station can be expressed as a relation between the positional information of the base station and the positional information of the mobile terminal, with the constraint that the scatterer corresponding to the base station must be located on the line. In a conventional single reflection model, the positional information of the scatterer corresponding to the base station and the positional information of the mobile terminal need to be estimated together when using an Iterative Weighted Least-squares (IWL) method. In the embodiment, since the indoor environmental information is known, the positional information of the scatterer corresponding to the base station can be substituted by the positional information of the base station and the positional information of the mobile terminal. That is, the positional information of the scatterer can be considered as a known parameter, and only the position information of the mobile terminal need to be estimated. This is referred to as the CIWL method.

Since the data set which is observed is subject to errors caused by noise, a model using by the CIWL can be expressed by the equation: $z_{s_c} = h_{s_c}(x_M) + n_{s_c}$, where $h_{s_c}(x_M) \in \mathfrak{R}^{3K-1 \times 1}$ is a mapping function between the data set and the positional information of the mobile terminal, $n_{s_c}$ is a noise vector and be can be a Gaussian distribution with mean zero and covariance matrix $K_{S_c}$.

According to the model, a cost function can be defined with a maximum likelihood criteria as: $J_{s_c}(x_M) = (z_{s_c} - h_{s_c}(x_M))^T K_{s_c}^{-1}(z_{s_c} - h_{s_c}(x_M))$. However, since $J_{s_c}(x_M)$ is a nonlinear and nonconvex function for $x_M$, the estimation cannot be obtained directly.

In the embodiment, an iterative approach is used. Let $\hat{x}_{M,i}$ be the estimated positional information in the i-th iteration. Expanding $J_{s_c}(\hat{x}_{M,i+1})$ by a first-order Taylor series with respect to $x_M$, then $h_{s_c}(\hat{x}_{M,i+1})$ can be linearized as the equation: $h_{s_c}(\hat{x}_{M,i+1}) \cong h_{s_c}(\hat{x}_{M,i}) + H_{s_c,i}(\hat{x}_{M,i+1} - \hat{x}_{M,i})$, where $H_{s_c,i} \in \mathfrak{R}^{3K-1 \times 2}$ is the Jacobian matrix for the i-th iteration.

From the above equation, the positional information of the mobile terminal $x_M$ can be estimated by using the IWL method. The specific estimation equation is: $\hat{x}_{M,i+1} = \hat{x}_{M,i} + (H_{s_c,i}^T K_{s_c}^{-1} H_{s_c,i})^{-1} H_{s_c,i}^T K_{s_c}^{-1}(z_{s_c} - h_{s_c}(\hat{x}_{M,i}))$.

In one embodiment, the geometric localization (GL) method is used to estimate the positional information of the mobile terminal based on the positional information of the scatterer, the positional information of the base station, and the data set observed in the base station, and the estimated positional information obtained from the GL method can be used as an initial value of the CIWL method. The GL method is a commonly used positioning method and is not described here.

Since the CIWL method is an iterative algorithm, determining when to stop the method is important. In one embodiment, the determination can be applied by using a ratio of a log likelihood function (LLF) calculated in the current iteration and that in the previous iteration. If a difference of one and the ratio is below a threshold γ, a determination to stop the CIWL can be made. In one embodiment, the LLF is defined based on a standard deviation of path length differences, azimuth and elevation AoD, and azimuth and elevation AoA.

Figure 3:
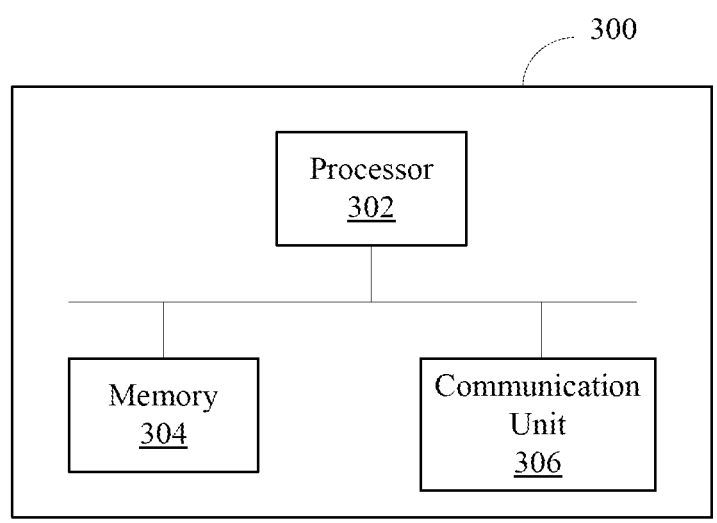
FIG. 3 is a schematic block diagram of one embodiment of an apparatus for establishing an indoor location.

FIG. 3 is a block diagram of a apparatus 300 for establishing an indoor location. In one embodiment, the apparatus 300 is a server. The apparatus 300 comprises a processor 302, a memory 304, and a communication unit 306. The processor 302 comprises a microcontroller, a microprocessor, a complex instruction set computing microprocessor, a compact instruction set computing microprocessor, an ultraparallel instruction set computing microprocessor, and a digital signal processor or other circuitry having processing capability. The processor 302 is configured to execute or process instructions, data, and computer programs stored in the memory 304. The memory 304 comprises read-only memory, random access memory, magnetic memory medium devices, optical memory medium devices, flash memory devices, electrical, optical or other computer readable memory medium, comprising physical/tangible and non-transitory devices. The memory 304 is coupled to the processor 302 to store one or more computer programs that control the operation of the apparatus 300, and are executed by the processor 302. In one embodiment, the method of FIG. 2 is applied in the apparatus 300 and is executed by the processor 302 and stored in the memory 304.

In summary, the indoor positioning method and apparatus make use of known indoor environmental information to reduce the need for an element of estimation in establishing positional information of the scatterer during the positioning process and so improve the efficiency of establishing location of a target terminal.

The embodiments shown and described above are only examples. Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method of establishing location of a mobile terminal, the method comprising:
   obtaining indoor environmental information;
   receiving a set of data, from a base station, of the mobile terminal;
   determining, based on the indoor environmental information and the set of data of the mobile terminal, a line that contains a two-dimensional (2D) planar projection point of the base station, a 2D planar projection point of the mobile terminal, and a scatterer corresponding to the base station;
   obtaining positional information of the scatterer, by applying a constraint that the scatterer must be located on the line; and
   estimating positional information of the mobile terminal based on the positional information of the base station, the set of data, and the positional information of the scatterer, wherein the positional information of the mobile terminal is estimated by applying a constrained iterative weighted least-squares method.

2. The method of claim 1, wherein the indoor environmental information comprises:
   positional information of a plurality of base stations and a distribution of a plurality of scatterers.

3. The method of claim 1, wherein the set of data comprises:
   time difference of arrival, angle of arrival, and angel of departure.

4. The method of claim 1, obtaining positional information of the scatterer, by applying a constraint that the scatterer must be located on the line comprises:
   substituting the positional information of the base station and the positional information of the mobile terminal with the positional information of the scatterer.

5. The method of claim 1, wherein estimating the positional information of the mobile terminal by applying a constrained iterative weighted least-squares method comprises:
   estimating the positional information of the mobile terminal using an iterative weighted least-squares method with a constrain that the scatterer must be located on the line and the positional information of the scatterer is a known parameter.

6. An apparatus configured for establishing location of a mobile terminal, the apparatus comprising:
   a processor; and
   a memory storing at least one computer program, wherein the at least one computer program comprises instructions which are executed by the processor, the instructions comprising:
   obtaining indoor environmental information;
   receiving a set of data, from a base station, of the mobile terminal;
   determining, based on the indoor environmental information and the set of data of the mobile terminal, a line that contains a two-dimensional (2D) planar projection point of the base station, a 2D planar projection point of the mobile terminal, and a scatterer corresponding to the base station;
   obtaining positional information of the scatterer, by applying a constraint that the scatterer must be located on the line; and
   estimating positional information of the mobile terminal based on the positional information of the base station, the set of data, and the positional information of the scatterer, wherein the positional information of the mobile terminal is estimated by applying a constrained iterative weighted least-squares method.

7. The apparatus of claim 6, wherein the indoor environmental information comprises:
   positional information of a plurality of base stations and a distribution of a plurality of scatterers.

8. The apparatus of claim 6, wherein the set of data comprises:
   time difference of arrival, angle of arrival, and angel of departure.

9. The apparatus of claim 6, wherein the instruction of obtaining positional information of the scatterer, by applying a constraint that the scatterer must be located on the further comprises:
   substituting the positional information of the base station and the positional information of the mobile terminal for the positional information of the scatterer.

10. The apparatus of claim 6, wherein the instruction of estimating the positional information of the mobile terminal using a constrained iterative weighted least-squares method comprises:
    estimating the positional information of the mobile terminal using an iterative weighted least-squares method with a constrain that the scatterer must be located on the line and the positional information of the scatterer is a known parameter.

11. A non-transitory computer readable storage medium, wherein the computer readable storage medium stores at least one instruction, the at least one instruction implementing a method of establishing location of a mobile terminal when executed by a processor, the instructions comprising:
    obtaining indoor environmental information;
    receiving a set of data, from a base station, of the mobile terminal;
    determining, based on the indoor environmental information and the set of data of the mobile terminal, a line that contains a two-dimensional (2D) planar projection point of the base station, a 2D planar projection point of the mobile terminal, and a scatterer corresponding to the base station;
    obtaining positional information of the scatterer, by applying a constraint that the scatterer must be located on the line; and
    estimating positional information of the mobile terminal based on the positional information of the base station, the set of observation data, and the positional information of the scatterer, wherein the positional information of the mobile terminal is estimated by applying a constrained iterative weighted least-squares method.

* * * * *